United States Patent
Kappelhoff (12)

(10) Patent No.: US 12,526,916 B2
(45) Date of Patent: Jan. 13, 2026

(54) PRINTED CIRCUIT BOARD FOR USE WITH AN EXTERIOR LIGHTING DEVICE OF A MOTOR VEHICLE, AND MOTOR VEHICLE

(71) Applicant: HELLA GmbH & Co. KGaA, Lippstadt (DE)

(72) Inventor: Martin Kappelhoff, Bad Sassendorf (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 266 days.

(21) Appl. No.: 18/385,154

(22) Filed: Oct. 30, 2023

(65) Prior Publication Data

US 2024/0064894 A1 Feb. 22, 2024

Related U.S. Application Data

(63) Continuation of application No. PCT/EP2022/060071, filed on Apr. 14, 2022.

(30) Foreign Application Priority Data

Apr. 29, 2021 (DE) ...................... 10 2021 111 052.1

(51) Int. Cl.
*H05K 1/02* (2006.01)
*B60Q 1/00* (2006.01)
(Continued)

(52) U.S. Cl.
CPC ............ *H05K 1/0284* (2013.01); *H05K 1/03* (2013.01); *H05K 1/117* (2013.01); *B60Q 1/0094* (2013.01);
(Continued)

(58) Field of Classification Search
CPC ................. H05K 1/117; H05K 1/0286; H05K 2201/0979
See application file for complete search history.

(56) References Cited

U.S. PATENT DOCUMENTS

| 11,221,120 B2 | 1/2022 | Hermitte et al. |
| 2007/0128891 A1* | 6/2007 | Ling .................. H05K 1/117 |
| | | 439/55 |

(Continued)

FOREIGN PATENT DOCUMENTS

| DE | 10250674 A1 | 5/2004 |
| DE | 102004048433 A1 | 4/2006 |
| EP | 3299710 A1 | 3/2018 |

OTHER PUBLICATIONS

International Search Report dated Aug. 18, 2022 in corresponding application PCT/EP2022/060071.

*Primary Examiner* — Timothy J Thompson
*Assistant Examiner* — Amol H Patel
(74) *Attorney, Agent, or Firm* — Muncy, Geissler, Olds & Lowe, P.C.

(57) ABSTRACT

A printed circuit board which can be used as an identical part embodied in different exterior lighting devices of a motor vehicle. The printed circuit board includes a first connecting interface and a second connecting interface, each for accommodating a plug for establishing an electrical connection between the printed circuit board and at least one component that is otherwise separate from the printed circuit board, this connection being used for the power supply and/or control of at least one component that is arrangeable on the printed circuit board, and the second connecting interface of the printed circuit board being arranged on the printed circuit board in a manner offset both translationally and rotationally relative to the first connecting interface of the printed circuit board.

15 Claims, 4 Drawing Sheets

(51) Int. Cl.
    *F21S 41/19*         (2018.01)
    *F21V 23/00*         (2015.01)
    *H05K 1/03*          (2006.01)
    *H05K 1/11*          (2006.01)

(52) U.S. Cl.
    CPC .......... *F21V 23/006* (2013.01); *H05K 1/0201* (2013.01); *H05K 1/115* (2013.01)

(56) References Cited

U.S. PATENT DOCUMENTS

2016/0076724 A1    3/2016  Jin et al.
2022/0190499 A1*  6/2022  Friesen .............. H01R 12/7017

\* cited by examiner

PRINTED CIRCUIT BOARD FOR USE WITH AN EXTERIOR LIGHTING DEVICE OF A MOTOR VEHICLE, AND MOTOR VEHICLE

This nonprovisional application is a continuation of International Application No. PCT/EP2022/060071, which was filed on Apr. 14, 2022, and which claims priority to German Patent Application No. 10 2011 111 052.1, which was filed in Germany on Apr. 29, 2021, and which are both herein incorporated by reference.

BACKGROUND OF THE INVENTION

Field of the Invention

The invention relates to a printed circuit board for use with an exterior lighting device of a motor vehicle. The invention further relates to a motor vehicle comprising a first printed circuit board and a second printed circuit board.

Description of the Background Art

The assembly of a motor vehicle takes place using numerous individual parts, which are brought into operative connection with one another by force-fit, form-fit, and/or integrally joined connections in a plurality of assembly steps. In particular for the mass production of motor vehicles, correspondingly large quantities of each individual part are necessary. In turn, individual manufacturing processes are based on each individual part and must be defined, configured, and monitored. In terms of the most uncomplicated and cost-efficient production of motor vehicles possible, it is therefore desirable to keep the total number of individual parts used, but also in particular the number of various individual parts, as small as possible. This allows on the one hand standardized assembly processes, and on the other hand a reduction in the required manufacturing processes, which ultimately means a cost reduction for individual components and thus also for the entire motor vehicle. Thus, there is a great effort to design as many components as possible as identical parts, thus allowing identical components to be used for the same or similar functions at different locations in the motor vehicle.

In this regard, for motor vehicles there is the basic problem that, although in principle multiple identical or similar assembly parts are present, due to their different installation positions they have a different spatial orientation and a correspondingly different, for example mirror-symmetrical, design. As an example, reference is made to the mirror-symmetrical or essentially mirror-symmetrical arrangement and design of exterior lighting devices of a motor vehicle. However, this different spatial orientation of assembly parts may result in interfaces of a component being accessible in a first assembly part orientation (in a right headlight, for example), but being inaccessible and/or no longer appropriately oriented when the same component is used in an assembly part orientation that is different from the first (in a left headlight, for example). Accordingly, the different spatial orientations of the assembly parts also require the manufacture of individually adapted components, which may correspondingly be used only within an assembly part for a specific spatial orientation. More specifically, this problem may be described with reference to printed circuit boards used in exterior lighting devices of motor vehicles. Exterior lighting devices of motor vehicles, depending on their arrangement at different sides of the motor vehicle, are embodied in two different, mirror-symmetrical or essentially mirror-symmetrical variants. Consequently, individual printed circuit boards must also be present in the particular assembly parts, which in their design and in particular with regard to the configuration of their interfaces take into account the particular characteristics of the various spatial orientations. It is usually not possible to change the spatial orientation of structurally identical printed circuit boards for use in different assembly parts, since the installation orientation of the printed circuit boards is often prescribed. One possible reason may be that the printed circuit board bears a light on its top side which must be in a defined orientation relative to the rest of the headlight module, and at the same time also cannot be mounted on the bottom side of the printed circuit board instead of on the top side. Thus, there are only limited options for changing the spatial orientation of the printed circuit board. The problem is further exacerbated by interfaces at the printed circuit boards which have an asymmetrical design or which are situated at or in the vicinity of the outer edges of a printed circuit board. In this case, a change in the spatial orientation of a printed circuit board may result in it no longer being possible to use the interface with a plug provided for this purpose, whose orientation is not changeable because the interface is not accessible or no longer appropriately oriented. In this case, it is therefore necessary to manufacture two different printed circuit boards whose design is individually adapted to the requirements of the mirror-symmetrically designed assembly parts.

SUMMARY OF THE INVENTION

It is therefore, an object of the present invention to overcome at least one of the disadvantages described above. In particular, an object of the invention is to provide a printed circuit board for use with an exterior lighting device of a motor vehicle, which can be used as an identical part in different exterior lighting devices of a motor vehicle. Accordingly, it is a further object of the invention to reduce the complexity of an exterior lighting device of a motor vehicle or of an entire motor vehicle, and also the number of underlying manufacturing processes, and to design the manufacture of such printed circuit boards to be simpler and more cost-efficient.

The above object is achieved by a printed circuit board and by a motor vehicle. The motor vehicle according to the invention may include the printed circuit board according to the invention, so that reciprocal reference may be made to the individual technical features.

According to an example of the invention, a printed circuit board for use with exterior lighting of a motor vehicle is provided, a printed circuit board according to the invention including a first connecting interface and a second connecting interface. The first connecting interface and the second connecting interface are each designed to accommodate a plug for establishing in each case an independent electrical connection between the printed circuit board and at least one component that is otherwise separate from the printed circuit board, this connection being used for power supply and/or control of at least one component that is arrangeable on the printed circuit board. In addition, it is provided according to the invention that the second connecting interface of the printed circuit board is arranged on the printed circuit board in a manner offset both translationally and rotationally relative to the first connecting interface of the printed circuit board. Good accessibility of at least one of the two connecting interfaces in different installation positions and/or installation orientations is ensured by the translational and rotational offset between the first connecting interface and the second connecting interface.

The translational offset of the second connecting interface of the printed circuit board relative to the first connecting interface of the printed circuit board is understood as a translational offset in the plane of the flat extension of the printed circuit board. In addition, the rotational offset of the second connecting interface of the printed circuit board relative to the first connecting interface of the printed circuit board is understood as a rotational offset in the plane of the flat extension of the printed circuit board. Accordingly, the rotational axis must lie orthogonally with respect to the plane of the flat extension of the printed circuit board. The plane of the flat extension of the printed circuit board is defined below by two direction vectors X and Y which are orthogonal to one another. Together with a third direction vector Z, the direction vectors X, Y, and Z form a three-dimensional Cartesian coordinate system. Similarly, the direction vector Z is oriented orthogonally with respect to the direction vectors X and Y, and points in the direction of the depth extension of the printed circuit board, which may also be referred to as the thickness or material thickness. The stated definitions of the various coordinate directions are used in the following discussion. Reference should be made to the figures for interpretation of the various spatial directions.

The component which is separate from the printed circuit board and which is connectable to the printed circuit board via the first or second connecting interface can be understood to mean an independent component that is not part of the printed circuit board. However, this likewise involves the concept that this component and the printed circuit board in the mounted state may be part of a shared assembly part. In the mounted state, the component in question and the printed circuit board may thus be directly or indirectly connected to one another or mounted on one another. It is important only that the printed circuit board represents a single, stand-alone device that is connectable in various ways to other components, separate from the printed circuit board, only within the scope of an installation.

A plug connection, as it results within the meaning of the invention by the arrangement of a plug at the first and/or second connecting interface of the printed circuit board, can be a force-fit and/or form-fit connection between two plug parts for establishing a preferably detachable connection between electrical lines and/or strip conductors. Within the meaning of the invention, a plug may be an individual component, or may also be provided by forming some other component. A connection of lines for optical radiation is also conceivable within the scope of the invention. In general, for plug connections a distinction is made between male and female plug parts, which are designed to fit together in such a way that in each case a male plug and a female plug may form a connection of the stated types. The present invention encompasses a design of the first and/or second connecting interface as a female plug, as well as a design of the first and/or second connecting interface as a male plug. A plug connection generally provides the advantage that a connection to other components may be quickly and easily established. Plug connections are also generally reversible. In other words, after a connection is established, plug connections may be easily disconnected, in particular nondestructively. This simplifies the replacement of components within the scope of maintenance operations as well as the general installation effort.

The first connecting interface and/or the second connecting interface of the printed circuit board can be formed by the shaping of the printed circuit board itself. In other words, the first connecting interface and/or the second connecting interface are/is not an additional component that is arranged on the printed circuit board. Rather, the connecting interface is formed by form elements such as boreholes, milled cutouts, punchings, and/or recesses in the printed circuit board itself. These may be circular, oval, ellipsoidal, rectangular, square, and/or elongated form sections in the printed circuit board. In addition, the formation of a connecting interface by bending the printed circuit board in sections or by a combination of the stated embodiments is possible. As a result of forming the first connecting interface and/or second connecting interface by shaping the printed circuit board itself, a simple, economical, and space-saving option is provided for establishing a connection between the printed circuit board and one or more other components. In addition, the number of individual parts is reduced, since in particular for a design of the connecting interfaces for accommodating a plug, no additional plug connectors have to be mounted on the printed circuit board and laboriously secured in position. Accordingly, the installation and reliability of the printed circuit board are enhanced in a simple manner.

The first connecting interface and/or the second connecting interface of the printed circuit board can be situated at an outer side or in the immediate vicinity of an outer edge of the printed circuit board. Such a design of the printed circuit board is understood to be independent of the shaping of the printed circuit board, and is intended to mean an arrangement of the first connecting interface and/or second connecting interface of the printed circuit board at or in the immediate vicinity of the outer contour of the printed circuit board. It is likewise conceivable for individual form elements of the connecting interface to be blended with the outer contour of the printed circuit board. Angular as well as round and/or curved cross-sectional shapes of the printed circuit board, and also a sectionwise combination of different variants, are achievable. By situating the first connecting interface and/or the second connecting interface of the printed circuit board at an outer side of the printed circuit board, particularly short distances between the connecting interfaces and other components may be achieved, as a result of which cable connections may have a short, cost-efficient design.

For a printed circuit board it may be provided that the first plug interface and the second plug interface have an identical and/or redundant design. In the case of a purely identical design of the plug interfaces, both connecting interfaces are thus designed in the same way, and corresponding to one of the stated embodiments. In the case of a redundant design of the first and second plug interfaces, both plug interfaces also fulfill the same function. In other words, the supplying of power to, and/or the control of, the same component situated on the printed circuit board may take place via the first plug interface and also via the second plug interface. Similarly, according to the invention it may be provided that, depending on the installation orientation of the printed circuit board, to use either only the first connecting interface or only the second connecting interface, although in both cases the same functional scope may be provided by the printed circuit board. In particular, via a redundant design of the first and second connecting interfaces of a printed circuit board, the advantage is achieved that multiple connecting interfaces for basically the same functions may be situated at different positions on the printed circuit board. Since for use in different assembly parts, depending on the spatial orientation of a printed circuit board according to the invention, other regions of the printed circuit board may be accessible, for example for attaching a plug, the flexibility of the printed circuit board for use in different installation positions is thus also increased, while at the same time the functional scope of a printed circuit board according to the invention is fully maintained. At the same time, other functional elements of the printed circuit board, such as the components that are controllable via a connecting interface, associated receiving devices, and/or corresponding strip conductors, at least in part no longer have to be designed in multiples on the printed circuit board, as a result of which the printed circuit board may be designed in a cost-effective and straightforward manner. In other words, at least a portion of the infrastructure situated on a printed circuit board according to the invention, such as strip conductors and/or receiving devices, may be used in conjunction with multiple connecting interfaces, thus making a multiple design of these elements, or at least of portions of these elements, obsolete.

Likewise within the scope of the invention, for a printed circuit board it may be provided that a printed circuit board according to the invention can have even further connecting interfaces in addition to the first and second connecting interfaces. These may have a design that is identical to or different from the first and/or second connecting interface, or among one another may have designs that partially identical and/or different. The following exemplary embodiments, which refer to the specific design and/or arrangement of the first and/or second connecting interface of the printed circuit board, may likewise be valid for any further connecting interfaces. The use of additional connecting interfaces as needed allows a flexible expansion of the functional scope of the printed circuit board according to the invention.

The printed circuit board can have a rectangular or essentially rectangular design, and the first connecting interface can be situated at a first longitudinal edge of the printed circuit board and the second connecting interface of the printed circuit board is situated at a second longitudinal edge of the printed circuit board opposite the first longitudinal edge. It is likewise conceivable for the first connecting interface to be situated at a first transverse edge of the printed circuit board, and for the second connecting interface to be situated at a second transverse edge of the printed circuit board opposite the first transverse edge. Longitudinal edges are understood to mean those outer edges of the rectangular cross section of the printed circuit board that have a larger spatial extension than the remaining two outer edges. The remaining two shorter outer edges are correspondingly referred to as transverse edges. Of course, the arrangements of the first and second connecting interfaces described above may similarly be defined for a square cross section of the printed circuit board, a distinction between longitudinal edges and transverse edges naturally no longer being applicable, and the information being limited solely to the statement that the first connecting interface is situated at an outer edge of the printed circuit board and the second connecting interface is situated at a second outer edge opposite the first outer edge. Of course, the described shape of the arrangement of the first and second connecting interfaces is likewise transferable to round, oval, or other cross-sectional shapes, depending on the opposite or essentially opposite arrangement of the first and second connecting interfaces. This achieves the advantage that, in particular for printed circuit boards that have an elongated extension and for which an arrangement of the connecting interfaces in the region of a transverse edge is not practicable, particularly easy access to at least one of the two connecting interfaces in various installation positions and/or installation orientations is ensured, and thus allows the simple arrangement of a plug, conductor, and/or cable at the printed circuit board in different installation positions and/or installation orientations. The described manner of arranging the first and second connecting interfaces has proven to be advantageous with regard to the use of a printed circuit board according to the invention as an identical part in different exterior lighting devices of a motor vehicle. If a printed circuit board according to the invention is used in two different exterior lighting devices of the same type, these are often arranged mirror-symmetrically. Accordingly, a mirror-symmetrical or essentially mirror-symmetrical arrangement of the printed circuit boards according to the inventions is also necessary. Provided that the orientation of the top or bottom side of the printed circuit boards in question is unchangeable, as a result of a mirror-symmetrical arrangement of two printed circuit boards according to the invention, in each case the same outer edges of the printed circuit boards point in different installation directions in different orientations. To illustrate this, for example the directions of the normal vectors of the same outer edges in different installation positions are compared, the normal vectors being orthogonally situated on the outer edges of the printed circuit boards and pointing away from the printed circuit board. In other words, in a mirror-symmetrical arrangement of two printed circuit boards according to the invention, a second outer edge of a second printed circuit board in a second installation position occupies a position that is comparable or even identical to the first outer edge, opposite the second outer edge, of a first printed circuit board in a first installation position. This statement refers in particular to the orientation of the particular outer edges of a printed circuit board relative to other assembly parts and/or components. An arrangement of the first and second connecting interfaces at opposite outer edges of a printed circuit board thus allows improved accessibility of at least one of the two connecting interfaces in different installation positions. These considerations may be similarly transferred to other cross-sectional shapes. However, in particular for kite-shaped cross-sectional shapes of a printed circuit board according to the invention, it may thus be advantageous to arrange the first and second connecting interfaces at neighboring outer edges of the printed circuit board in order to obtain the advantages described above. This applies for concave as well as convex kite-shaped quadrilaterals.

Corresponding to the above statements, the plane of the flat extension of the printed circuit board can be defined by the two directions X and Y. As an advantageous refinement of a printed circuit board according to the invention, it is also conceivable for the first and second connecting interfaces of the printed circuit board to have a translational offset only with regard to a direction of the flat extension of the printed circuit board, and to have no or essentially no offset with regard to the other direction of the flat extension. In other words, the first and second connecting interfaces may be situated at opposite outer edges of the printed circuit board with regard to the X direction, thus having a translational offset in the X direction, but may be situated at the same or essentially the same position with regard to the Y direction. Likewise conceivable is a corresponding arrangement of the first and second connecting interfaces in which an offset is present only in the Y direction, and the same or essentially the same positioning is present with regard to the X direction. Both variants, in particular for an asymmetrical design of the first and/or second connecting interface, may be combined with an additional rotational offset of the connecting interfaces relative to one another. This results in the advantage that when the installation orientation of the printed circuit board is changed, in particular by rotation about a rotational axis that is perpendicular to the plane of the flat extension, the first connecting interface may assume the same or essentially the same position as that previously held by the second connecting interface, and vice versa. This has proven to be advantageous, particularly for mirror-symmetrical installation orientations. The complexity of the exterior lighting devices of a motor vehicle or of the entire motor vehicle, as well as the number of underlying manufacturing processes, may be reduced in this way. Likewise, the manufacture of such printed circuit boards may be designed to be simpler and more cost-efficient.

The first connecting interface and/or the second connecting interface of the printed circuit board can be designed to accommodate a three-pole plug. The use of the printed circuit board in combination with two-pole, four-pole, or further multi-pole types of plugs is likewise conceivable. In a further advantageous embodiment of the invention, the first connecting interface and/or the second connecting interface of the printed circuit board are/is designed to accommodate a plug according to the Raster-Anschluss-Steck-Technik [grid connection plug technology] (RAST)) standard. This results in the option for versatile usability of the printed circuit board in combination with likewise standardized components, as well as a known, and thus simple and at the same time largely error-free, type of installation.

The printed circuit board can have a symmetrical design in a first region, and/or can have an asymmetrical design in a second region. This applies in particular with regard to a plane of symmetry that extends in parallel to the longitudinal extension of the printed circuit board and intersects the printed circuit board so that it divides the surface of the printed circuit board into two subareas having the same or essentially the same size. In particular, it is conceivable for the first connecting interface and the second connecting interface of the printed circuit board to be situated in the region of the printed circuit board having an asymmetrical design. In other words, it is conceivable for the asymmetrical region of the printed circuit board to result from the arrangement of the first and second connecting interfaces on the printed circuit board, the first and second connecting interfaces being asymmetrical with respect to one another. In particular, it may also be provided that the asymmetrical region of the printed circuit board is smaller than the symmetrical region. As a result of the design of a printed circuit board according to the invention in the manner described, the advantage is achieved that the first and second connecting interfaces of a printed circuit board are in the most comparable and/or identical positions possible when the printed circuit board according to the invention is used as an identical part in different, in particular mirror-symmetrical, exterior lighting devices of a motor vehicle. This statement refers in particular to the orientation of the particular outer edges of a printed circuit board relative to other assembly parts and/or components. In particular for a smallest possible design of the asymmetrical region, i.e., an arrangement of the first and second connecting interfaces in the immediate or closest possible vicinity, a particularly similar and/or identical position of the first and second connecting interface in different installation positions may be achieved.

A perforation in the form of multiple, in particular circular or essentially circular, recesses or boreholes can be provided on the printed circuit board, in particular in the region of the printed circuit board having a symmetrical design, which serves to cool the printed circuit board. The perforation results in the advantage that the surface of the printed circuit board is locally enlarged, so that improved heat exchange with the surroundings may take place. This is intended to mean heat exchange with the ambient air and also with the components situated in the surroundings of the printed circuit board. In particular, a perforation in the form of more than four, preferably fewer than 15, particularly preferably 8 or 13, boreholes is provided. In particular, cooling of a component mounted on the printed circuit board, for example an LED, may take place due to the perforation of a printed circuit board according to the invention, it being conceivable for this component to rest directly against the printed circuit board and therefore directly transfer heat to the printed circuit board. Indirect heat transfer via the ambient air, for example, is also conceivable. The perforation of a printed circuit board according to the invention thus serves to efficiently dissipate heat, transferred by the component to the printed circuit board, to the surroundings, and thus keep the thermal load on the component, and also on the printed circuit board itself, as low as possible, which has a positive effect on the durability and reliability of the printed circuit board and of the component in question.

In a likewise advantageous refinement of the printed circuit board, a receiving device may be situated on the printed circuit board, in particular in the region of the printed circuit board having a symmetrical design, via which a component may be situated at the printed circuit board, and the receiving device preferably being formed by the shaping of the printed circuit board itself. In particular, it may be provided that the receiving device is formed by a total of four recesses on the printed circuit board, two of the recesses having a circular cross-sectional shape and two further recesses having an oval or ellipsoidal cross-sectional shape. Due to a design of the first receiving device via the shaping of the printed circuit board itself, a simple, economical, and space-saving option is provided for allowing arrangement of a component on the printed circuit board.

Also, for a printed circuit board, the first connecting interface and the second connecting interface can each be formed by two spaced-apart circular recesses and a third, elongated recess, the third, elongated recess being situated between the first recess and the second recess. According to the invention, it may be provided that the third, elongated recess is not situated centrally between the first and the second recess, but, rather, has an offset toward either the first or the second recess. In addition, electrical contacts may preferably be situated between the first and the second recess, the third, elongated recess in turn being situated between two electrical contacts. According to the invention, the first and second recesses may be provided to enter into a form-fit and preferably reversible connection with a corresponding detent of a plug that is situatable at the connecting interface. In other words, the first and second recesses are used to allow a suitable plug to latch to the connecting interface and thus be held in position at the printed circuit board. Unintentional detachment of the plug from the printed circuit board is thus avoided, as a result of which the interruption of the electrical connection achieved by the plug connection may be prevented. The third recess is also used to accommodate a mating piece that is formed within the plug. The arrangement of a plug only in a certain orientation of this plug at the connecting interface is thus possible due to the offset of the third, elongated recess. This results in the advantage that a faulty arrangement of a plug at the printed circuit board may be effectively avoided.

A recess for accommodating a fastener may be preferably centrally formed in the printed circuit board, the recess preferably having two different form sections, a first form section being designed in the shape of a circle, and a second form section being designed in the shape of an elongated hole. The form section designed in the shape of a circle allows the fastener, which may preferably be designed as a screw or threaded bolt, in combination with a nut, to be easily and conveniently led through. The form section designed in the shape of an elongated hole allows the advantage of a translational displacement of the printed circuit board in relation to the fastener, and thus allows flexible positioning of the printed circuit board along the elongated hole, with a spatial orientation that is otherwise the same. In this way, a printed circuit board according to the invention may be easily and reliably fastened to an exterior lighting device of a motor vehicle and flexibly positioned. An unintentional change in the installation orientation of a printed circuit board according to the invention due to operation-related vibrations may thus be effectively prevented. If the contact between the printed circuit board and the fastener takes place, at least partially, in the region of the form section in the shape of an elongated hole, the support surface of the fastener on the printed circuit board is enlarged. This results in the advantage that the retention force of the fastener may be absorbed over a larger surface area of the printed circuit board, thus reducing the risk of punching out. In addition, a merely circular design of the recess without an additional form section in the shape of an elongated hole is conceivable within the scope of the invention.

It may also be advantageous for a printed circuit board according to the invention to be made, at least partially, of a flame-retardant composite material. This may preferably be a class FR-4 composite material. Furthermore, within the scope of the invention it is conceivable for the printed circuit board to have a material thickness between 1 mm and 2 mm, in particular between 1.3 mm and 1.7 mm, particularly preferably a material thickness of exactly 1.5 mm. The stated material thicknesses have proven to be advantageous for a printed circuit board according to the invention for use in a motor vehicle, since the printed circuit board having a material thickness in the stated ranges on the one hand has sufficient stability to reliably withstand shocks and vibrations, and on the other hand has a design that saves material and is weight-efficient.

It has likewise been shown to be advantageous when a printed circuit board according to the invention has a width between 8 mm and 20 mm, in particular between 10 mm and 15 mm, preferably between 13 mm and 14 mm, particularly preferably a width of exactly 13.8 mm, and/or a length between 40 mm and 80 mm, in particular between 50 mm and 70 mm, preferably between 60 mm and 62 mm, particularly preferably 61.5 mm. The length is defined as the extension of the printed circuit board along its longitudinal edges, and the width is defined as the extension of the printed circuit board along its transverse edges. With regard to an ellipsoidal printed circuit board or other formations, the length and the width may be interpreted as the maximum dimensions of the printed circuit board along two mutually orthogonal directions in the plane of the flat extension of the printed circuit board.

A further advantageous design of a printed circuit board may provide that the first connecting interface of the printed circuit board and the second connecting interface of the printed circuit board are situated on the printed circuit board in such a way that a critical material thickness of the printed circuit board is not fallen below between the third, elongated recess in the first connecting interface and the third, elongated recess in the second connecting interface. The critical material thickness of the printed circuit board is 1 mm, preferably 2.5 mm, particularly preferably 2.8 mm. This results in the advantage that the first and second connecting interfaces of the printed circuit board do not form a natural weak point of the printed circuit board, and the printed circuit board thus remains robust against external influences such as vibrations or a force effect during assembly and/or disassembly. For use of a printed circuit board according to the invention in exterior lighting devices, this has proven to be advantageous, since in particular for these assembly parts, comparatively frequent maintenance operations and corresponding assembly and disassembly operations may result during operation of a motor vehicle. In addition, these assembly parts are often acted on continuously by vibration during operation of a motor vehicle, so that damage from material fatigue may be appropriately prevented.

Moreover, the above object is achieved by a motor vehicle that comprises a first printed circuit board according to the invention and a second printed circuit board according to the invention, and at least one power supply unit and/or a control unit, the at least one power supply unit and/or the control unit being electrically connected to the first printed circuit board via the first or second connecting interface of the first printed circuit board, and/or being connected to the second printed circuit board via the first or second connecting interface of the second printed circuit board, and these connections being respectively used for power supply and/or control of a component situated on the first printed circuit board and a component situated on the second printed circuit board. According to one embodiment of a printed circuit board, the first printed circuit board and the second printed circuit board are designed according to the first aspect of the invention. Use of such printed circuit boards results in the same advantages for a motor vehicle as stated for a printed circuit board according to the first aspect of the invention. In particular by use of structurally identical printed circuit boards in different exterior lighting devices of a motor vehicle, the total number of different individual parts installed in a motor vehicle may be reduced. Similarly, the number of manufacturing processes required for manufacturing the various individual parts may be reduced, which has a positive effect on the manufacturing costs for printed circuit boards and motor vehicles according to the invention. In addition, confusion between components and installation errors during assembly of a motor vehicle according to the invention may be effectively prevented by the use of structurally identical printed circuit boards for different exterior lighting devices.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
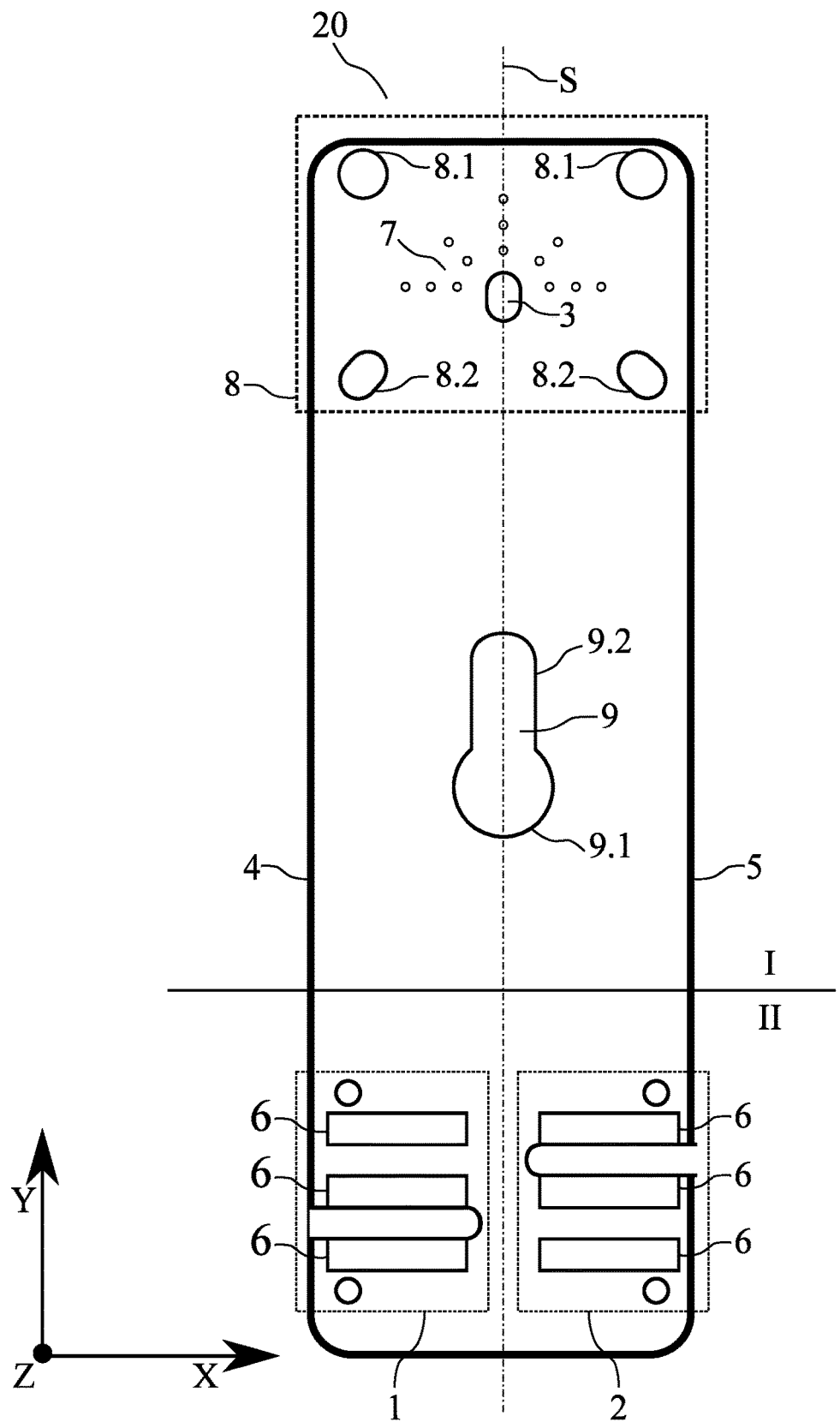
FIG. 1 shows a top view of the top side/front side of a printed circuit board according to the invention.

FIG. 1 shows a top view of the top side or front side of a printed circuit board 20 according to the invention for use with an exterior lighting device 30 of a motor vehicle 40, the viewing angle being oriented orthogonally with respect to the plane of the longitudinal extension of the printed circuit board 20. The printed circuit board 20 includes a first connecting interface 1 and a second connecting interface 2, each for accommodating a plug 50 for establishing an electrical connection between the printed circuit board 20 and at least one component 60, otherwise separate from the printed circuit board 20, this connection being used for the power supply and/or control of at least one component 3 situated on the printed circuit board 20, and the second connecting interface 2 of the printed circuit board 20 being arranged on the printed circuit board 20 in a manner offset both translationally and rotationally relative to the first connecting interface 1. Due to the translational and rotational offset between the first connecting interface 1 and the second connecting interface 2, the advantage is achieved that in different installation positions of the printed circuit board 20 in various exterior lighting devices 30 of a motor vehicle 40, at least one of the two connecting interfaces 1, 2 remains accessible, even if the orientation of the printed circuit board 20, in particular of the outer edges of the printed circuit board 20, changes in relation to other components or assembly parts.

FIG. 1 also shows the directions X and Y, which are oriented orthogonally with respect to one another and which form a plane (XY plane). The direction Y points along the longitudinal extension of the printed circuit board 20, i.e., parallel to the longitudinal edges of the illustrated printed circuit board 20. The direction X in turn points orthogonally with respect to the direction Y along the transverse edges of the printed circuit board 20, and thus in the width direction of the printed circuit board 20. In addition, a third direction Z is defined which is orthogonal to the plane spanned by the directions X and Y and which thus points in the depth direction of the printed circuit board 20, which also corresponds to the thickness or material thickness of the printed circuit board 20. The directions X, Y, and Z thus form a three-dimensional Cartesian coordinate system.

FIG. 1 shows that the second connecting interface 2 has a translational offset and also a rotational offset relative to the first connecting interface 1. If both connecting interfaces 1, 2 were conceptually superimposed, this would require on the one hand a translational displacement of the first connecting interface 1 from the longitudinal edge 4 to the opposite longitudinal edge 5 of the printed circuit board 20, and on the other hand, a rotation of the first connecting interface 1 by 180°. This information is expressed in arc degrees. The underlying rotational axis for this consideration is perpendicular to the XY plane, and intersects the area average or the geometric center of gravity of the first connecting interface 1 present in the XY plane. In other words, the rotation of a connecting interface 1, 2 described here means that this connecting interface rotates about itself. As a result, the first connecting interface 1 and the second connecting interface 2 may be brought into a congruent position only by superposition resulting from a translational displacement and a rotational displacement.

The first connecting interface 1 and the second connecting interface 2 are situated on the printed circuit board 20 in the lower region of the printed circuit board 20, the connecting interfaces being formed not by additional components on the printed circuit board 20, but instead by the shaping of the printed circuit board 20 itself, and in each case being situated at an outer edge of the printed circuit board 20. The printed circuit board 20 has a rectangular design with rounded corners. The first connecting interface 1 is situated at a first longitudinal edge 4 of the printed circuit board 20, and the second connecting interface 2 is situated at a second longitudinal edge 5 of the printed circuit board 20. This type of arrangement of the first and second connecting interfaces 1, 2 has proven to be advantageous with regard to the use of a printed circuit board 20 according to the invention as an identical part in different exterior lighting devices 30 of a motor vehicle 40, since in particular a mirror-symmetrical arrangement of two printed circuit boards 20 results in opposite outer edges of a printed circuit board 20 assuming identical or comparable positions in the different installation orientations. This statement refers in particular to the orientation of the particular outer edges of a printed circuit board 20 with respect to other assembly parts and/or components of a motor vehicle 40 according to the invention. An arrangement of the first and second connecting interfaces 1, 2 at opposite outer edges of a printed circuit board 20 thus allows improved accessibility of at least one of the two connecting interfaces 1, 2 in different installation positions. Both connecting interfaces 1, 2 are designed to accommodate a three-pole plug 50, as may be determined based on the electrical contacts 6.

According to FIG. 1, the printed circuit board 20 has a symmetrical design in a first region I, and has an asymmetrical design in a second region II. The symmetrical region I extends above the horizontal marking depicted in FIG. 1. In contrast, the asymmetrical region II extends below this marking. Corresponding to FIG. 1, this applies with regard to a plane of symmetry S, which extends in parallel to the longitudinal extension of the printed circuit board 20 along the direction Y and intersects the printed circuit board 20 in such a way that it divides the surface of the printed circuit board 20 into two subareas of equal size. With regard to FIG. 1, the plane of symmetry is thus a YZ plane. The longitudinal extension of the printed circuit board 20 extends in parallel to the longitudinal edges 4 and 5 of the printed circuit board 20, and thus in the Y direction. The first connecting interface 1 and the second connecting interface 2 are situated in the asymmetrical region II of the printed circuit board 20. Stated in another way, the asymmetrical region II of the printed circuit board 20 results from the asymmetry of the connecting interfaces 1 and 2, which are situated at opposite outer edges, in the present case at the first and second longitudinal edges 4, 5 of the printed circuit board 20. According to the exemplary embodiment of a printed circuit board 20 according to the invention shown in FIG. 1, the asymmetrical region II of the printed circuit board 20 is much smaller than the symmetrical region I of the printed circuit board 20. The reason is that the first connecting interface 1 and the second connecting interface 2 are situated in the immediate vicinity of one another. In other words, the distance between the connecting interfaces 1, 2 has been selected to be as small as possible, under the condition that the connecting interfaces 1, 2 be situated at opposite outer edges of the printed circuit board 20. As a result, the first and second connecting interfaces 1, 2 of a printed circuit board 20 are advantageously in the most comparable and/or identical positions possible when the printed circuit board 20 according to the invention is used as an identical part in different, in particular mirror-symmetrical, exterior lighting devices 30 of a motor vehicle 40. This statement refers in particular to the orientation of the respective outer edges of a printed circuit board 20 with respect to other assembly parts and/or components of a motor vehicle 40 according to the invention.

FIG. 1 also illustrates a perforation 7 of the printed circuit board 20 in the form of multiple boreholes, which are used for cooling the printed circuit board 20. The perforation 7 is situated in the symmetrical region I of the printed circuit board 20. In addition, a component 3 on the printed circuit board 20 is situated in the region of the perforation 7, and is supplied with power and/or controlled via the connecting interface 1 and/or the connecting interface 2. The component 3 may be an LED or some other illuminant, for example. Since the component 3 does not have to be fixedly connected to the printed circuit board 20, but instead may be nondestructively separated from same, reference numeral 3 is likewise to be understood as a corresponding receiving device of the printed circuit board 20 for the component 3. The heat transferred from the illuminant to the printed circuit board 20 during operation may be efficiently dissipated to the surroundings through the perforation 7. The thermal load on the component 3 and also on the printed circuit board 20 may thus be kept as low as possible, which has a positive effect on the durability and reliability of the printed circuit board 20 and of the component 3. Likewise situated in the symmetrical region I of the printed circuit board 20 is a receiving device 8 via which a further component that is different from the component 3 may be situated at the printed circuit board 20. This further component may be an optical fiber, for example. The receiving device 8 is formed by the shaping of the printed circuit board 20 itself, and includes two circular recesses 8.1 and two further recesses in the shape of an elongated hole 8.2. Other shapes of the recesses 8.1 and 8.2, such as rectangles, squares, or ellipses, are likewise possible.

A further recess 9 in the printed circuit board 20 which is designed to accommodate a fastener is also apparent in FIG. 1, the recess 9 having two different form sections 9.1 and 9.2, the first form section 9.1 being designed in the shape of a circle and the second form section 9.2 being designed in the shape of an elongated hole. Of course, the design of the recess 9 in the form of only one form section is likewise conceivable. The recess 9 may be designed as a circular, ellipsoidal, elongated hole-shaped, rectangular, or square recess, which is not an exhaustive list. A combination of the stated embodiments is also possible.

FIG. 1 also shows that, although the first connecting interface 1 and the second connecting interface 2 have a translational offset along the X direction, with regard to the Y direction, i.e., the longitudinal extension of the printed circuit board 20, they are situated at an identical or essentially identical position. In addition, a rotational offset of 180° (arc degrees) is present between the second connecting interface 2 and the first connecting interface 1. This results in the advantage that the printed circuit board 20 may be rotated in the plane of its longitudinal extension (XY plane) in such a way that it may be installed in different, in particular mirror-symmetrical, exterior lighting devices 30, while at the same time an identical or essentially identical orientation of at least one plug interface 1, 2 with respect to other assembly parts and/or components of a motor vehicle 40 is ensured. If a printed circuit board 20 according to the invention is rotated by 180° (arc degrees), for example, in the plane of its longitudinal extension (XY plane), the second connecting interface 2 assumes the identical or essentially identical position that the first plug interface 1 had prior to the rotation. Similarly, the second plug interface 2 in a second installation position may fulfill precisely those functions that the first plug interface 1 had in a first installation position.

Figure 2:
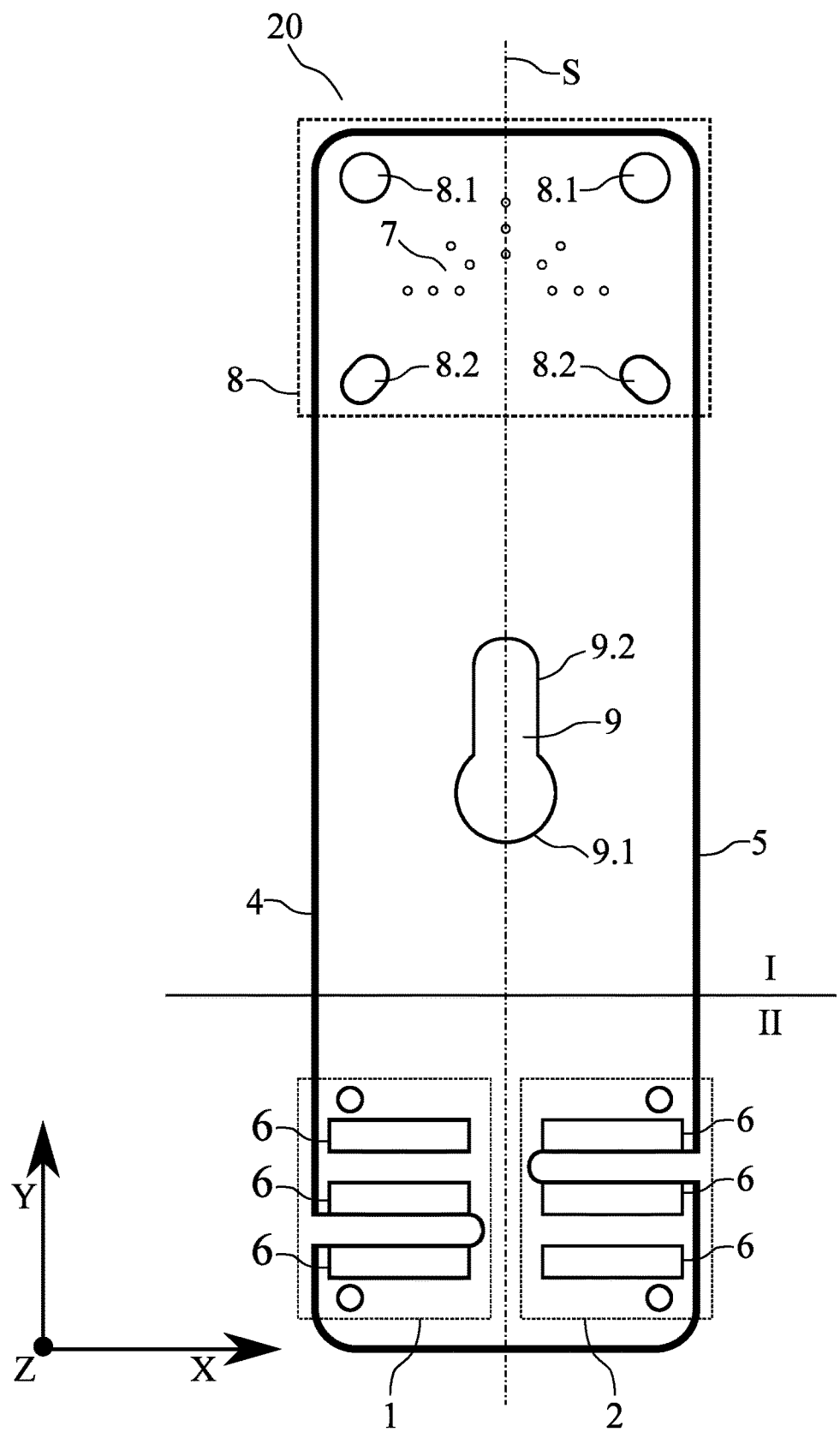
FIG. 2 shows a top view of the bottom side/rear side of a printed circuit board according to the invention.

FIG. 2 shows a top view of the bottom side or rear side of a printed circuit board 20 according to the invention for use with an exterior lighting device 30 of a motor vehicle 40, the viewing angle being oriented orthogonally with respect to the plane of the longitudinal extension of the printed circuit board 20. All recesses 8.1, 8.2, 9 previously described for the example from FIG. 1 are likewise apparent in FIG. 2, since they extend through the printed circuit board 20. The component 3 or the receiving device 8 for the component 3 is not depicted in FIG. 2, since it is present only on the top side or front side of the printed circuit board 20. The orientation of the printed circuit board 20 in relation to the exterior lighting device 30 of a motor vehicle 40 is thus fixed, since the component 3, which may be an LED, for example, must be oriented in a predefined manner with respect to the exterior lighting device 30. Thus, it is clear that the installation orientation of the printed circuit board 20 is not arbitrarily selectable. For use of the printed circuit board 20 according to the invention in two different exterior lighting devices 30 of basically the same type (a left headlight and a right headlight, for example), the printed circuit board 20 may therefore only be translationally displaced and rotated in the plane of its longitudinal extension (XY plane).

Figure 3:
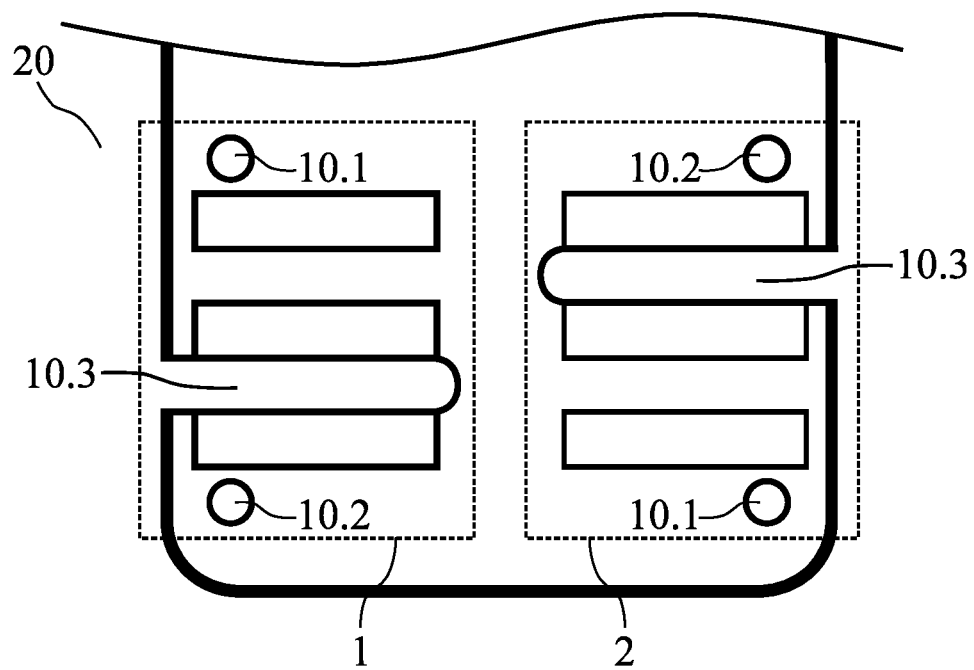
FIG. 3 shows the design according to the invention of the first and second connecting interfaces of a printed circuit board according to the invention.

FIG. 3 shows the design of the first connecting interface 1 and of the second connecting interface 2 of a printed circuit board 20 according to the invention. It is apparent that the first connecting interface 1 and the second connecting interface 2 are each formed by two spaced-apart circular recesses 10.1 and 10.2 and a third, elongated recess 10.3, the third, elongated recess 10.3 being situated between the first recess 10.1 and the second recess 10.2. The third, elongated recess is not centrally situated between the recesses 10.1 and 10.2, but instead has an offset relative to the first recess 10.1 or the second recess 10.2. Electrical contacts 6 are situated, preferably equidistantly, between the first recess 10.1 and the second recess 10.2. The third, elongated recess 10.3 in turn is situated between two electrical contacts 6. The first recess 10.1 and the second recess 10.2 are each used to accommodate a detent of a plug 50, so that the plug latches to the connecting interface 1, 2 and cannot come out of position on its own. The plug 50 engages around the printed circuit board 20. In other words, a portion of the plug 50 comes to rest on the top side of the printed circuit board 20, and another portion of the plug 50 comes to rest on the bottom side of the printed circuit board 20. At the same time, a lip 50.2 situated in the gap in the plug 50, provided for accommodating the printed circuit board 20, engages with the recess 10.3 in the printed circuit board 20. Since the recess 10.3 is not centrally situated between the recesses 10.1 and 10.2, this results in only one possible orientation of the plug 50 in which it can be mounted at the first connecting interface 1 or the second connecting interface 2. At the same time, the present embodiment of the first and second connecting interfaces 1, 2 illustrates the benefit of the present invention. Due to the asymmetrical arrangement of the third, elongated recess 10.3 between the circular recesses 10.1, 10.2, only by a simultaneous translational offset and rotational offset between the first and second connecting interfaces 1, 2 can it be ensured that in different installation orientations of a printed circuit board 20 according to the invention, at least one of the connecting interfaces 1, 2 is aligned in a correct orientation with respect to a plug 50 having a fixed orientation.

Figure 4:
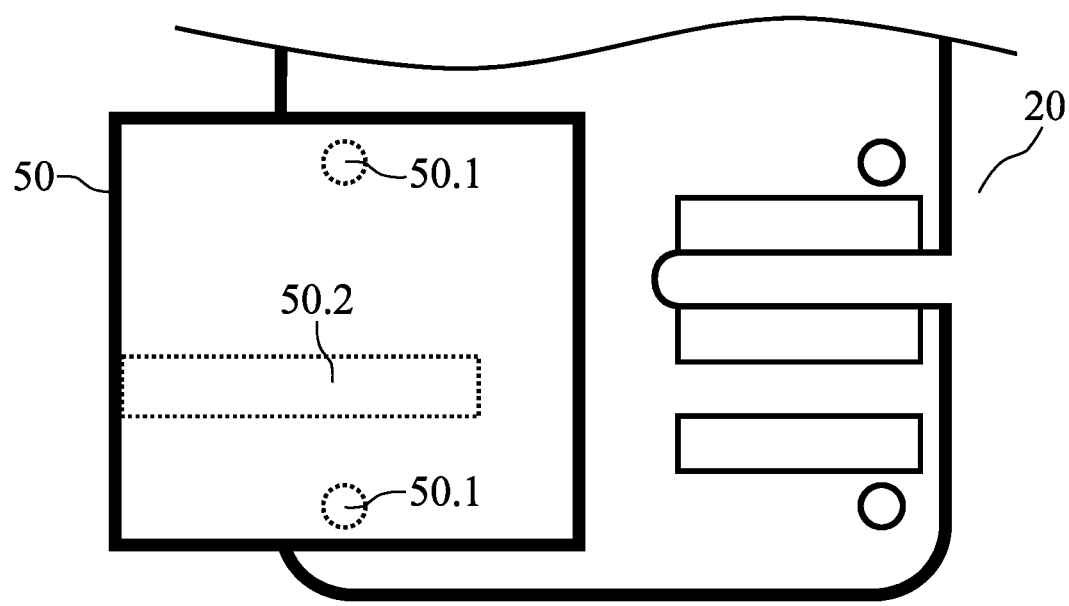
FIG. 4 shows the arrangement of a plug at a printed circuit board according to the invention.

FIG. 4 schematically shows the printed circuit board 20 together with a plug 50 that is situated at the first connecting interface 1. The detent 50.1 of the plug 50 is schematically illustrated by the dashed-line circles, and engage with the first recess 10.1 and the second recess 10.2 in the first connecting interface 1. At the same time, a lip 50.2 situated at the plug 50 engages with the third, elongated recess 10.3 of the first connecting interface 1, thus ensuring correct positioning of the plug 50.

Figure 5:
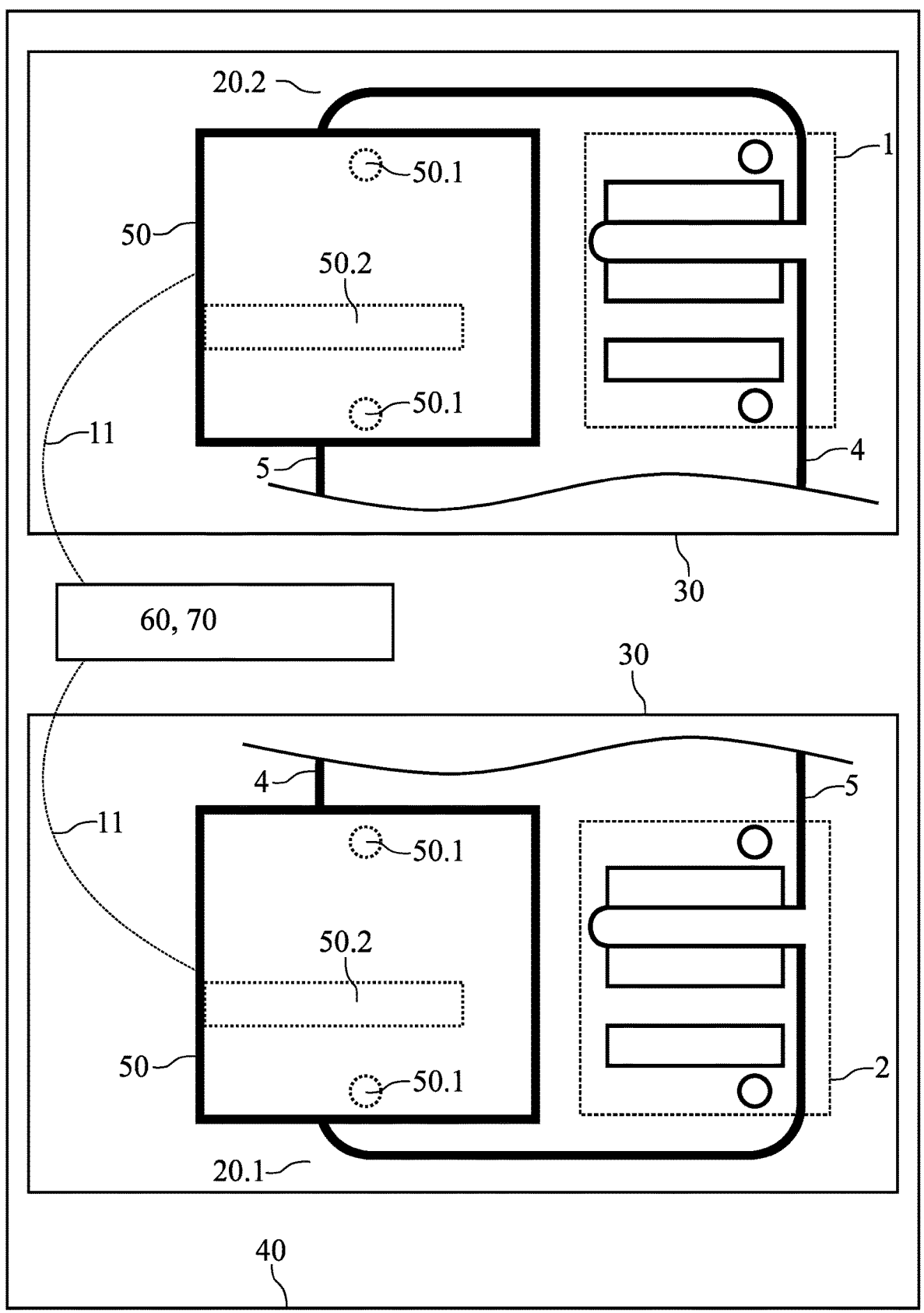
FIG. 5 shows the use of a first and second printed circuit board as identical parts in various exterior lighting devices of a motor vehicle.

FIG. 5 schematically shows a motor vehicle 40, comprising a first printed circuit board 20.1 and a second printed circuit board 20.2, as well as a power supply unit 60 and a control unit 70, the power supply unit 60 and/or the control unit 70 being electrically connected to the first printed circuit board 20.1 via the first connecting interface 1 of the first printed circuit board 20.1, and being connected to the second printed circuit board 20.2 via the second connecting interface 2 of the second printed circuit board 20.2, and this connection being used for supplying power to a component 3 situated on the first printed circuit board 20.1 and to a component 3 situated on the second printed circuit board 20.2; for reasons of clarity, the component is not illustrated in FIG. 5. The power supply unit 60 and the control unit 70 are illustrated as a single component for simplification. These may also be individual, in particular spatially separate, components. In addition, each exterior lighting device 30 may have its own power supply unit 60 and/or control unit 70. The connections between the first and the second printed circuit boards 20.1, 20.2 and the power supply unit 60 and/or control unit 70 are established via a cable 11 that is only schematically illustrated, at the end of which the plug 50, which is compatible with the connecting interfaces 1, 2 of the printed circuit board 20, is fastened. The plug 50 has a fixed orientation due to the installation situation in the motor vehicle 40. However, at the same time, the first printed circuit board 20.1 and the second printed circuit board 20.2 have different orientations due to their use in different exterior lighting devices 30. In the present example, the first printed circuit board 20.1 is connected to the power supply unit 60 and/or control unit 70 via its first connecting interface 1. The second connecting interface 2 of the first printed circuit board 20.1 remains unused. To achieve an appropriate installation orientation of the second printed circuit board 20.2 in the corresponding exterior lighting device 30, the second printed circuit board has been rotated, in the plane of its longitudinal extension, by 180° with respect to the first printed circuit board 20.1. The rotational axis is perpendicular to the stated plane. As a result, the first connecting interface 1 of the second printed circuit board 20.2 on the one hand no longer points toward the plug 50, and on the other hand is also no longer compatible with the orientation of the plug 50. This is also illustrated by the fact that in the installation position of the first printed circuit board 20.1, the first longitudinal edge 4 has an orientation that is directed toward the plug 50. In contrast, in the installation position of the second printed circuit board 20.2, the second longitudinal edge 5 of the second printed circuit board 20.2 has an orientation that is directed toward the plug 50, whereas the first longitudinal edge 4 of the second printed circuit board 20.2 is oriented pointing away from the plug 50. However, as a result of the arrangement according to the invention of the second connecting interface 2 on the second printed circuit board 20.2, due to the rotation of the second printed circuit board 20.2 the second connecting interface 2 of the second printed circuit board 20.2 has now assumed a position that is comparable to the first connecting interface 1 of the first printed circuit board 20.1, which is compatible with the orientation of the plug 50. Similarly, it is apparent that the printed circuit board 20, as an identical part, may be used in different installation orientations and thus for different exterior lighting devices. Accordingly, it is no longer necessary to design or manufacture different printed circuit boards for various embodiments of exterior lighting devices. The total number of various individual parts installed in the motor vehicle 40 may thus be reduced due to the use of printed circuit boards 20 according to the invention as an identical part in different exterior lighting devices 30 of a motor vehicle 40. Likewise, the number of manufacturing processes necessary for manufacturing the various individual parts may be reduced, which has a positive effect on the manufacturing costs of printed circuit boards 20 according to the invention as well as motor vehicles 40 according to the invention. In addition, confusion between components and installation errors during assembly of a motor vehicle 40 according to the invention may be effectively prevented by the use of structurally identical printed circuit boards 20 for different exterior lighting devices 30.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A printed circuit board for an exterior lighting device of a motor vehicle, the printed circuit board comprising: a first connecting interface; and a second connecting interface, the first and second connecting interface each accommodating a plug to establish an independent electrical connection between the printed circuit board and at least one component that is otherwise separate from the printed circuit board, the independent electrical connection being used for the power supply and/or control of the at least one component that is arranged on the printed circuit board, wherein the second connecting interface of the printed circuit board is arranged on the printed circuit board in a manner offset both translationally and rotationally relative to the first connecting interface.

2. The printed circuit board according to claim 1, wherein the first connecting interface and/or the second connecting interface of the printed circuit board are/is formed by the shaping of the printed circuit board itself or are/is situated at an outer side of the printed circuit board.

3. The printed circuit board according to claim 1, wherein the first connecting interface and the second connecting interface of the printed circuit board have a substantially identical and/or redundant design.

4. The printed circuit board according to claim 1, wherein the printed circuit board has a rectangular or essentially rectangular design, and wherein the first connecting interface is situated at a first longitudinal edge of the printed circuit board and the second connecting interface is situated at a second longitudinal edge of the printed circuit board opposite the first longitudinal edge.

5. The printed circuit board according to claim 1, wherein the first connecting interface and the second connecting interface are each designed to accommodate a three-pole plug.

6. The printed circuit board according to claim 1, wherein the printed circuit board has a symmetrical design in a first region and has an asymmetrical design in a second region with respect to a plane of symmetry that extends substantially in parallel to the longitudinal extension of the printed circuit board and intersects the printed circuit board so that it divides the surface of the printed circuit board into two subareas having the same size.

7. The printed circuit board according to claim 6, wherein the first connecting interface and the second connecting interface are situated in the region of the printed circuit board having an asymmetrical design.

8. The printed circuit board according to claim 1, wherein a perforation in the form of multiple boreholes is provided on the printed circuit board, the perforation serving to cool the printed circuit board.

9. The printed circuit board according to claim 1, wherein a receiving device is arranged on the printed circuit board, via which a further component that is different from the at least one component is situated at the printed circuit board, and wherein the receiving device is formed by the shaping of the printed circuit board itself.

10. The printed circuit board according to claim 1, wherein the first connecting interface and the second connecting interface are each formed by two spaced-apart circular recesses and a third, elongated recess, wherein the third, elongated recess is arranged between the first recess and the second recess.

11. The printed circuit board according to claim 10, wherein the first connecting interface and the second connecting interface are arranged on the printed circuit board such that a critical material thickness of the printed circuit board is not fallen below between the third, elongated recess in the first connecting interface and the third, elongated recess in the second connecting interface.

12. The printed circuit board according to claim 1, wherein a recess for accommodating a fastener is formed in the printed circuit board, wherein the recess has two different, overlapping form sections, a first form section being designed in the shape of a circle and a second form section being designed in the shape of an elongated hole.

13. The printed circuit board according to claim 1, wherein the printed circuit board is made, at least partially, of a flame-retardant composite material, and/or has a material thickness of between exactly 1 mm and 2 mm.

14. The printed circuit board according to claim 1, wherein the printed circuit board has a width between 10 mm and 15 mm and/or a length between 50 mm and 70 mm.

15. A motor vehicle comprising:
a first printed circuit board and a second printed circuit board, each being designed according to the printed circuit board according to claim 1; and
at least one power supply unit and/or a control unit, the at least one power supply unit and/or the control unit being electrically connected to the first printed circuit board via the first connecting interface or the second connecting interface of the first printed circuit board, and/or being connected to the second printed circuit board via the first connecting interface or the second connecting interface of the second printed circuit board, and this connection being used for power supply and/or control of a component arranged on the first printed circuit board and/or a component arranged on the second printed circuit board.

* * * * *